United States Patent [19]

Bresler

[11] 4,056,603
[45] Nov. 1, 1977

[54] PROCESS FOR INCREASING AMMONIA PRODUCTION

[75] Inventor: Sidney A. Bresler, New York, N.Y.

[73] Assignee: Bresler and Associates, Inc., New York, N.Y.

[21] Appl. No.: 695,457

[22] Filed: June 14, 1976

[51] Int. Cl.² .............................................. C01C 1/04
[52] U.S. Cl. ..................................... 423/359; 423/362
[58] Field of Search ............... 423/359, 360, 361, 362, 423/363

[56] References Cited

U.S. PATENT DOCUMENTS

| | | | |
|---|---|---|---|
| 2,610,106 | 9/1952 | Gray | 423/362 |
| 2,881,053 | 4/1959 | Bowers | 423/362 |
| 3,002,816 | 10/1961 | Friend et al. | 423/361 |

Primary Examiner—Edward J. Meros
Attorney, Agent, or Firm—Flynn & Frishauf

[57] ABSTRACT

Ammonia is synthesized from a hydrogen and nitrogen mixture containing small concentrations of inert contaminants such as argon, methane, etc. Gases dissolved in the ammonia product normally vented and discharged from the synthesis system are returned to the synthesis loop without removal of the inert contaminants. By so doing, despite the fact that the concentration of inert gases in the synthesis loop is increased, and the concentration of ammonia in the gas mixture leaving the synthesis converter is decreased, nevertheless the total amount of ammonia produced from a given quantity of hydrogen and nitrogen is increased.

6 Claims, 1 Drawing Figure

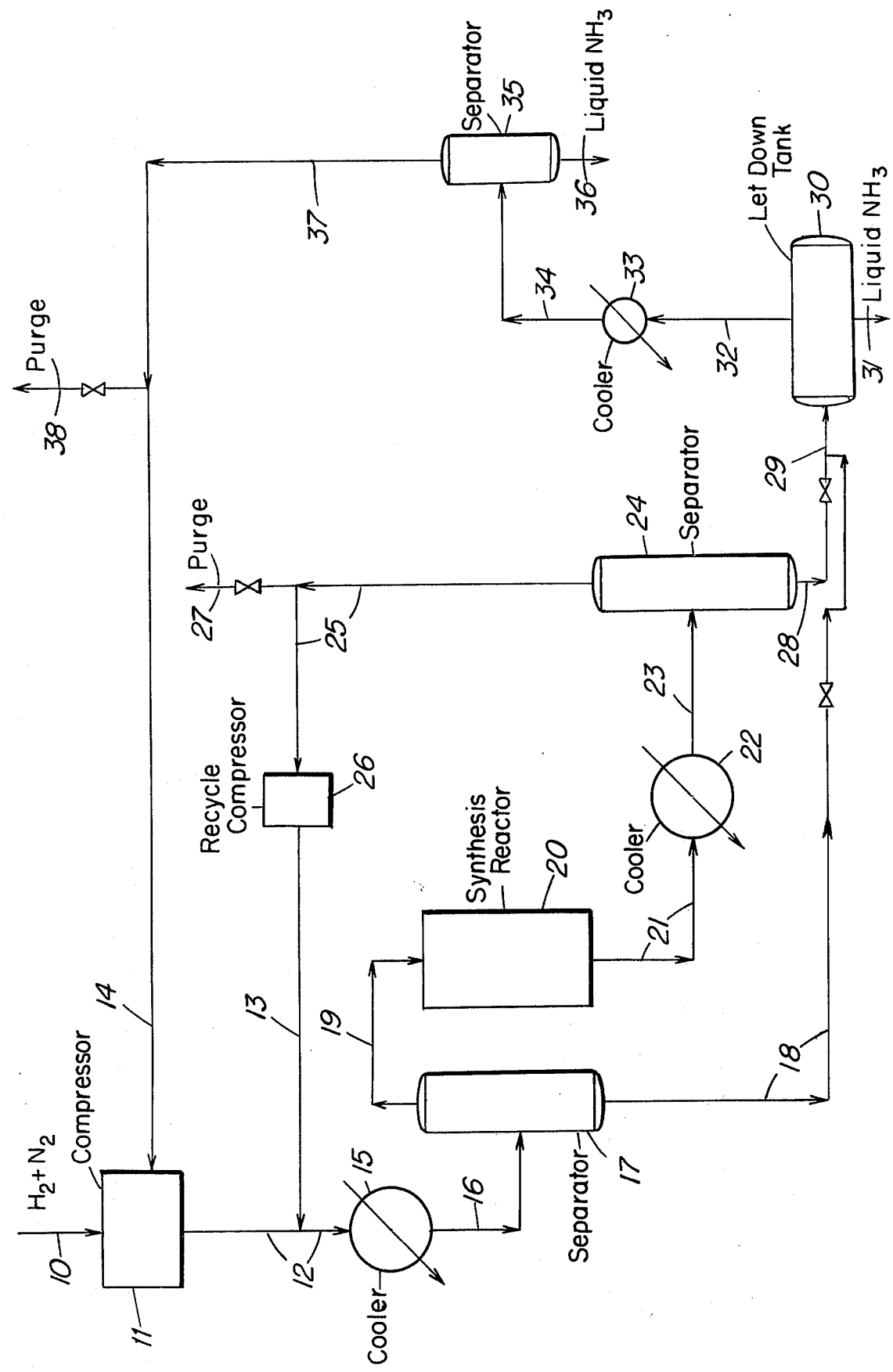

PROCESS FOR INCREASING AMMONIA PRODUCTION

FIELD OF INVENTION

This invention has to do with the production (synthesis) of ammonia from hydrogen and nitrogen. More specifically, it involves such a production from reactants containing small concentrations of the usual contaminants, argon and/or methane.

BACKGROUND OF THE INVENTION

Ammonia is produced industrially by passing a mixture of gases containing a large proportion of hydrogen and nitrogen, essentially in a 3-to-1 ratio, over a catalyst in an ammonia synthesis converter to promote the reaction of these two gases to form ammonia. Typically, 15-30 percent of the hydrogen and nitrogen react as the gas mixture flows through the converter. The operating pressure in the ammonia converter generally is between 150 and 400 atmospheres, and the operating temperature of the catalyst is from about 400° to about 550° C., preferably about 500° C.

The resulting gaseous reaction mixture leaving the converter is cooled in one or more stages. Most of the ammonia in the mixture condenses, forming a liquid product which is withdrawn from the sythesis system. Uncondensed ammonia, unreacted hydrogen and nitrogen, and other components of the gas mixture are recompressed and recyled back to the converter.

A stream of charge or make-up gas ($H_2$ and $N_2$) is added to the recycled gas before it enters the converter. As the system is to operate continuously, this make-up gas contains an amount of hydrogen and nitrogen which is equivalent to the product ammonia which is withdrawn plus any hydrogen, nitrogen and ammonia lost from the system.

Gases in the make-up stream other than hydrogen, nitrogen and ammonia may be divided into categories, i.e., catalyst poisons and inerts. The concentration of catalyst poisons, such as oxygen and oxygen compounds, must be reduced to a level at which they cannot exert a significant effect on the performance of the ammonia synthesis catalyst. Inert gases such as methane and argon can be tolerated in reasonably large quantities. However, the presence of such inert gases reduces the partial pressure of hydrogen and nitrogen in the synthesis loop (reactant charge system, converter, coolers, heat exchangers, separators, recycle compressor and recycle line), and thus reduces the amount of ammonia which is formed as the gas mixture passes over the catalyst.

All of the gases mentioned above have a limited solubility in liquid ammonia.

There are a number of feedstocks from which an ammonia charge and make-up gas can be produced, and a variety of methods which can be used to purify the crude make-up gas before it is piped to an ammonia converter. The following two examples serve to illustrate the range of processes employed industrially.

Currently, most ammonia is made from natural gas (essentially methane) or naphtha. After undergoing various reactions and purification steps, the feedstock is converted into a hydrogen-nitrogen gas mixture which, typically, contains from 0.8 to 1.3 percent by volumn of inert gases. As this gas mixture is recycled in a synthesis loop, its inert gas concentration typically is permitted to increase to from about 10 to about 20 percent.

The hydrogen produced in chlorine-caustic cells is also used to produce ammonia. The hydrogen-nitrogen mixture conveyed to the synthesis loop in such plants may contain from about 0.02 to about 0.3 percent inert gases, primarily argon.

Some of the inert gases, together with hydrogen and nitrogen, dissolve in the liquid product ammonia. This product ammonia is withdrawn from the high pressure synthesis loop and is piped to a let-down tank. This tank is maintained at a pressure, typically, of from about 200 to 300 psi. At this relatively low pressure, substantially all of the dissolved gases flash out of the liquid ammonia. However, a small amount of dissolved gas remains in the liquid leaving the let-down tank.

Even though the concentration of inert gases in the recycling gas stream of the synthesis loop is maintained at a fairly high level, as indicated previously, not all of the inert gases in the make-up gas stream dissolve in the ammonia product. Therefore, additional amounts of recycling gas must be bled continuously ("purged") from the system. This purge stream contains hydrogen, nitrogen and ammonia, in addition to the inert gases. Perhaps 5 percent by volume of the make-up gas is lost in this fashion, the exact amount being established by the process design.

It is important to recover the ammonia from the gases vented from the let-down tank and removed in the purge gas stream. Generally, this is done by cooling these gases in order to condense most of the ammonia. Alternatively, these gases can be scrubbed with water, or with any other liquid in which ammonia is soluble. Ammonia-free streams so obtained generally are burned in a furnace to recover their fuel values, released to the atmosphere, or conveyed to another process plant. In the past, the gases from the let-down tank have not been compressed and returned to the synthesis loop, because they still contain the unreactive inert gases and because it has been believed that the inert gas concentration in the circulating synthesis gas stream is already at the maximum desirable level.

It is possible to treat the purge gas stream and/or the gas from the let-down tank cryogenically, liquefying and removing substantially all of the inert gases. When this is done, the hydrogen and nitrogen can be returned to the ammonia synthesis loop. Alternatively, it is possible to treat the entire make-up stream cryogenically to remove substantially all of the inert gases before the stream is charged to the converter (e.g., Braun "Purifier" process).

When oil or coal is used as a feedstock, the resultant make-up gas can contain a high level of inert gases, for example up to about 1.5 percent by volume. In many instances, this make-up gas is scrubbed cryogenically ("Nitrogen Wash") to remove substantially all of the inert gases.

As described above, a relatively small portion of the hydrogen and nitrogen which is passed over the synthesis catalyst is converted into ammonia. Therefore, after removal of the ammonia, the unreacted hydrogen and nitrogen, together with any unreacted inert gases such as argon and methane, are compressed and again conveyed to the reactor. It is known that recycling of gases in the ammonia synthesis loop will result in an increase in the inert gas content of the synthesis loop. It is generally recognized that this recycling results in decreased conversion per pass of hydrogen and nitrogen for ammonia, and increased purging of reactant and inert gases from the synthesis loop. This is true in those instances in which the charge and make-up gas already contains a substantial inert gas content.

It is also known that gas from the let-down tank has been cooled to recover NH$_3$ therefrom, and to discharge the remaining gas from the system because of the inerts therein.

SUMMARY OF THE INVENTION

In accordance with the present invention, there is provided a process which can be used when the make-up gases contain relatively small, although significant, amounts of inert gases. It has been found that in such instances, contrary to usual and expected practice, the process of returning a portion, or all, of the vent gases from the let-down tank back to the ammonia synthesis loop is advantageous. Ammonia can be removed from the vent gas stream before this is done, if desired.

As the vent gas is returned to the synthesis loop, the inert gas concentrations throughout the process continue to rise. When all of the vent gas is returned, the quantity of inert gases dissolved in the liquid ammonia leaving the let-down tank is equal to that entering the process in the make-up gas (prior to recycling). With such an operation, very little hydrogen and nitrogen is lost from the process, and ammonia production is maximized.

SPECIFIC EMBODIMENTS OF THE INVENTION

Employed in the process are mixtures of hydrogen and nitrogen containing up to about one percent of inert gases such as argon and methane. All concentrations referred to herein are by volume, unless otherwise identified. A suitable source of hydrogen and nitrogen charge and make-up gases are hydrogen from a chlorine/caustic cell operation, and nitrogen obtained by air separation. A typical gas mixture contains about 300 parts per million (ppm) of argon and 30 ppm of methane.

Synthesis conditions and catalyst employed in this process are those conventionally employed. Such conditions are summarized in the following tabulation:

| | |
|---|---|
| Synthesis temperature, ° C. | 400 – 550 |
| Synthesis pressure, atm. | 150 – 400 |
| H$_2$/N$_2$ | c. 3/1 |
| Catalyst | iron promoted with K$_2$O, CaO and Al$_2$O$_3$ |
| Space velocity | 10,000 – 30,000 hr$^{-1}$. |

By the process of this invention, ammonia production is increased by about 1 ½ to 2 ½ percent, with no increase in feedstock requirements. However, there is a relatively small increase in utiity requirements (power to recompress the recycled vent gases plus cooling water and/or refrigeration to condense the increased ammonia production), and capital requirements may increase (additional incremental increase of equipment size to compensate for the increased inert gas concentration in the synthesis loop).

The FIGURE shows a simplified flow sheet of the process of the invention.

A mixture of hydrogen and nitrogen make-up is charged through line 10 in an approximate ratio of 3:1 to compressor 11. Also charged to compressor 11 is vent gas in line 14 from a let-down tank described below. The compressed gases are then delivered to line 12 wherein they are combined with recycle gas containing a small amount of ammonia in line 13. The combined gases are then passed into cooler 15 and line 16 into separator 17. Liquid ammonia is removed from separator 17 through valved line 18. It is to be understood that one or more cooling stages — represented by cooler 15 — can be employed. In addition to condensation and removal of ammonia, the combined gases are further purified by the removal of traces of carbon dioxide, water and oil in the gases.

Gases are removed overhead from separator 17 through line 19 for delivery to synthesis converter (reactor) 20. In the converter, a portion of the gases is converted to ammonia. Delivered from coverter 20 through line 21 is a gaseous reaction mixture comprising ammonia, hydrogen and nitrogen, with minor amounts of argon and/or methane. The gaseous mixture in line 21 is passed through cooler 22 (or a series of coolers), whereby the temperature of the mixture can be reduced from about 300° to about 30° C., and liquid ammonia separates from the mixture. From cooler 22, the cooled mixture is passed through line 23 to separator 24. Uncondensed ammonia, unreacted hydrogen and nitrogen, and some argon and/or methane, and removed overhead from separator 24 through line 25 and are passed to recycle compressor 26, wherein they are compressed to approximately the same pressure as in line 12 (or are passed to the last stage of compressor 11, not shown). The recycled gases are then passed through line 13 to line 12, and thence to converter 20.

A portion of the recycled gases can be purged from the synthesis loop through valved line 27.

Liquid separated in separators 17 and 24 comprises ammonia in which are dissolved small amounts of unreacted H$_2$ and N$_2$ and some of the A and/or CH$_4$ contaminants. The liquid is passed from separator 24 though valved line 28, is combined with liquid ammonia in valved line 18, and the combined liquid which has been let down in pressure to about 15–20 atmospheres is then passed through line 29 to let-down tank 30. Liquid ammonia containing a small amount of A and/or CH$_4$ is removed from tank 30 through line 31.

As the liquid product in line 29 flashes in tank 30, substantially all of the hydrogen, nitrogen, methane and/or argon therein are released. These gases, with a small amount of ammonia, are removed from tank 30 through line 32. They are cooled in cooler 33 from about 30° to about −20° C., and then passed through line 34 to separator 35. Liquid NH$_3$ separated in 35 is removed through line 36. The gases, containing a remaining small quantity of NH$_3$, are removed from 35 though line 37 and routed through line 14 to a stage of compressor 11 (generally having 2–6 stages).

Alternatively, the gases removed from separator 35 can be treated (not shown) to remove remaining traces of ammonia before being routed to compressor 11. Also, a compressor (not shown) other than 11 can be used to compress this vent gas prior to routing it to one of the stages of compressor 11 or to line 12.

Valved purge line 38 is connected to line 37 to purge a portion of the gases from the system.

Preferably, at least about 50 percent by volume of the vent gas from let-down tank 30 is recycled to converter 20.

The examples provided in the following table serve to illustrate the improved process of this invention.

The examples are for an ammonia synthesis plant having a production capacity of about 200 short tons per day; product ammonia is condensed and removed at the following temperatures: 140 T/D at 85° F. in line 18 and 60 T/D at 60° F. in line 28. The let-down tank 30 is operated at a pressure of about 315 pounds per square inch aboslute (psia).

EXAMPLE 1

A hydrogen-nitrogen make-up gas containing 18 parts per million (ppm) of argon is employed. The synthesis loop comes to equilibrium with about 0.09 percent of argon in the circulating gas. Under these conditions, an amount of argon equal to the quantity in the make-up gas — approximately 340 normal cubic feet per day (ncfd) — dissolves in the liquid ammonia and is withdrawn from the synthesis loop. Approximately 300,000 ncfd of hydrogen and nitrogen also dissolve in the liquid ammonia product. When the liquid product flashes in the let-down tank 30, substantially all of the hydrogen, nitrogen and argon are released. The liquid leaving let-down tank 30 contains approximately 11,000 ncfd of hydrogen plus nitrogen and approximately 15 ncfd of argon. The gas in line 32 contains about 190,000 ncfd of ammonia. By cooling the gases to 0° C. in 33, approximately 160,000 ncfd of ammonia is condensed.

In prior processes, the remaining gases in line 37 are purged from the system, or else treated — usually cryogenically — to remove the inert contaminants before being returned to line 12. The ammonia equivalent to the purged hydrogen and nitrogen is 3.5 tons per day (T/D), and the ammonia remaining in the purge gas is equal to about 0.7 T/D. The plant produces 215.4 T/D of ammonia from $18.67 \times 10^6$ ncfd of make-up gas.

A triply promoted iron catalyst is used as indicated above, for example as marketed by Halder Topsoe, by Catalyst and Chemicals Inc. or Girdler. Typical catalysts are described in the following text:

*An Investigation on Promoted Iron Catalysts For The Synthesis Of Ammonia;* Anders Nielsen; 3d edition, 1968; Jul Gjellerups Forlag, Copenhagen, Denmark.

In accordance with this invention, one can recycle up to about 95 percent of the let-down tank vent gases (270,000 ncfd) in lines 32, 34 and 37 without removing the argon from this hydrogen-nitrogen mixture, or from the charge and make-up gas in line 12. As this is done, the synthesis loop comes to equilibrium with about 0.9 percent of argon rather than about 0.09 percent. Ammonia production is increased by about 3.8 T/D.

When all of the gases in line 37 are recycled, the argon content of the loop gases increases to from about 0.9 to about 2.0 percent and ammonia production increases an additional 0.3 T/D.

EXAMPLE 2

A charge and make-up gas containing about 65 ppm is argon is employed.

A. (Comparative) In prior art processes, the synthesis loop is maintained so as to come to equilibrium with about 0.3 percent of argon. None of the gases in line 37 is recycled. Ammonia production is 215.4 short tons per day.

B. By recycling almost 90 percent of the gases in 37, and allowing the argon content in the loop to increase to 2.0 percent, an additional 3.6 T/D of ammonia is produced. When all the vent gases are recycled, an additional 0.5 T/D of ammonia is obtained. However, the argon level in the loop increases to about 6.7 percent. The value of the increased production of 0.5 T/D of ammonia is offset by the increased cost of a synthesis loop designed for 6.7 percent argon rather than 2.0 percent argon.

More details for Examples 1 and 2 are provided in the following tabulation.

| | Example 1 | | | Example 2 | | |
|---|---|---|---|---|---|---|
| Mode of Operation | Conventional | Partial Let-Down TK Vent Gas Recycle | Complete Let-Down TK Vent Gas Recycle | Conventional | Partial Let-Down TK Vent Gas Recycle | Complete Let-Down TK Vent Gas Recycle |
| Make-Up Gas, $H_2+N_2$, ncfd $\times 10^6$ | 18.67 | 18.67 | 18.67 | 18.67 | 18.67 | 18.67 |
| Loop Pressure - atm. | 350 | 350 | 350 | 350 | 350 | 350 |
| Argon in Make-up Gas - ppm (vol.) | 18 | 18 | 18 | 65 | 65 | 65 |
| - ncfd | 340 | 340 | 340 | 1,210 | 1,210 | 1,210 |
| Circ. Syn. Gas - Argon, percent | 0.09 | 0.9 | 2.0 | 0.32 | 2.0 | 6.7 |
| Gas in Liq. $NH_3$ from Syn. Loop | | | | | | |
| - Argon, ncfd | 340 | 3,400 | 7,700 | 1,210 | 7,700 | 25,400 |
| - $H_2+N_2$, ncfd | 300,000 | 297,000 | 294,000 | 299,000 | 294,000 | 280,000 |
| Gas in Liq. $NH_3$ from Let-Down Tk. | | | | | | |
| - Argon, ncfd | 15 | 150 | 340 | 55 | 340 | 1,210 |
| - $H_2+N_2$, ncfd | 11,000 | 11,000 | 10,500 | 11,000 | 10,500 | 10,000 |
| Gas Vented from Let-Down Tank | | | | | | |
| - Argon, ncfd | 325 | 3,250 | 7,360 | 1,155 | 7,360 | 23,190 |
| - $H_2+N_2$, ncfd | 289,000 | 286,000 | 283,500 | 289,000 | 283,500 | 270,000 |
| - $NH_3$, ncfd | 190,000 | 190,000 | 190,000 | 190,000 | 190,000 | 190,000 |
| $NH_3$ Rec. from Vent Gas - ncfd | 160,000 | 160,000 | 160,000 | 160,000 | 160,000 | 160,000 |
| Vent Gas recycled to Make-up | | | | | | |
| - Argon, ncfd | — | 3,060 | 7,360 | — | 6,490 | 23,190 |
| - $H_2+N_2$, ncfd | — | 270,000 | 283,500 | — | 250,000 | 270,000 |
| - $NH_3$, ncfd | — | 28,000 | 30,000 | — | 26,500 | 30,000 |
| Vent Gas Purged from Let-Down Tk. | | | | | | |
| - Argon, ncfd | 325 | 190 | — | 1,155 | 870 | — |
| - $H_2+N_2$, ncfd | 289,000 | 26,000 | — | 289,000 | 33,500 | — |
| - $NH_3$, ncfd | 30,000 | 2,000 | — | 30,000 | 3,500 | — |
| Net $NH_3$ Product, T/D | 215.4 | 219.2 | 219.5 | 215.4 | 219.0 | 219.5 |

I claim:

1. A process for the synthesis of ammonia from hydrogen and nitrogen, at least one of which is contaminated with at least one inert gas selected from the group consisting of argon and methane, which consists essentially of the following sequence:

contacting said hydrogen and nitrogen, together with recycled mixtures (C) and (E), described below, in a converter with an ammonia synthesis catalyst at elevated temperature and elevated pressure to form a gaseous reaction mixture (A) containing ammonia, unreacted hydrogen, unreacted nitrogen and inert gas contaminant, cooling said gaseous reaction mixture (A) and separating therefrom a liquid ammonia product (B) containing a portion of the unreacted hydrogen, unreacted nitrogen and inert gas contaminant therein, recycling the gaseous remainder (C) of said gaseous reaction mixture (A) to said converter, reducing the pressure of said liquid ammonia product (B) and separating therefrom liquid ammonia (D) and a gaseous mixture (E) containing unreacted hydrogen, unreacted nitrogen, ammonia and inert gas contaminant, and recycling a substantial portion of said gaseous mixture (E) without removing therefrom said inert gas contaminant to said converter.

2. The process of claim 1, wherein the temperature of said gaseous mixture of (E) and (C) together with the initial hydrogen and nitrogen charge gas is reduced, ammonia therein is removed as a liquid, and then the remainder of said combined gaseous mixture is conveyed to the ammonia synthesis converter.

3. The process of claim 1, wherein at least about fifty percent by volume of said gaseous mixture (E) is recycled to said converter.

4. The process of claim 1, wherein the temperature of said gaseous mixture (E) is reduced, a substantial portion of the ammonia therein is removed as a liquid, and the remainder of said gaseous mixture (E) containing said inert gas contaminant is recycled to said converter.

5. The process of claim 1, wherein said gaseous mixture (E) containing said inert gas contaminant is compressed before being recycled to said converter.

6. The process of claim 1, wherein from about 50 to about 100 percent by volume of said gaseous mixture (E) is recycled to said converter.

* * * * *